United States Patent Office 3,754,017
Patented Aug. 21, 1973

3,754,017
PRODUCTION OF CYANOACETALDEHYDE
Hans Juergen Strum, and Herbert Armbrust, Gruenstadt, Germany, assignors to Badische Anilin- & Soda-Fabrik Aktiengesellschaft, Ludwigshafen (Rhine), Germany
No Drawing. Continuation-in-part of application Ser. No. 30,287, Apr. 20, 1970. This application Oct. 14, 1971, Ser. No. 189,389
Claims priority, application Germany, Apr. 22, 1969, P 19 20 246.1
Int. Cl. C07c 121/02
U.S. Cl. 260—465.1                   6 Claims

ABSTRACT OF THE DISCLOSURE

Production of cyanoacetaldehyde by preparing an isoxazoline and splitting it in the presence of an inorganic base. The product is a valuable intermediate in the manufacture of dyes and pesticides.

---

This application is a continuation-in-part of our copending application Ser. No. 30,287, filed Apr. 20, 1970, for the production of cyanoacetaldehyde, now U.S. Pat. No. 3,647,854.

It is known from Gazz. Chim. Ital., 85, 34 et seq. (1955) and Atti Accad. Naz. Lincei, 6, 168 et seq. (1949), that cyanoacetaldehyde may be made by splitting isoxazole, which is in turn prepared by reacting propargyl alcohol or malonaldehyde bisdiethylacetal with hydroxyl amine. This known process uses starting materials which are not easily obtainable and provides unsatisfactory yields of the desired product.

It is an object of the invention to provide a novel liquid phase process for producing cyanoacetaldehyde in a simpler manner, in better yields and in greater purity.

This and other objects and advantages of the invention are achieved by splitting an isoxazoline of the formula:

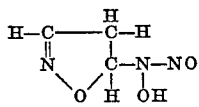

which is formed by reacting malonaldehyde dioxime with nitrous acid, said splitting being carried out in the prseence of alkali metal oxides or hydroxides or alkaline earth metal oxides or hydroxides.

Tautomerism may be postulated as existing between malonaldehyde oxime and its corresponding isoxazoline in accordance with the equation:

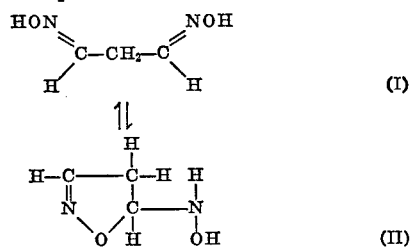

This tautomeric form (II) of the malonaldehyde oxime will react with nitrous acid to form the intermediate isoxazoline (III) according to the equation:

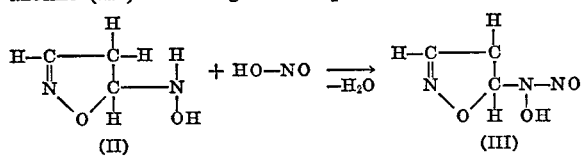

This intermediate isoxazoline (III) is relatively unstable and is readily split under the conditions of the new splitting process to yield cyanoacetaldehyde, i.e. in the presence of a base which is an alkali or alkaline earth metal oxide or hydroxide. The overall reaction can thus be presented by the equation:

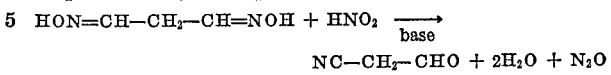

$$NC-CH_2-CHO + 2H_2O + N_2O$$

Compared with the previously known processes the process of the present invention, which uses more readily available starting materials, provides cyanoacetaldehyde in better yields and in greater purity in a simpler manner.

The starting material is the isoxazoline of the Formula III, which may be prepared by reacting malonaldehyde dioxime with nitrous acid as shown by the above equations.

The isoxazoline (III) is thus formed by reacting malonaldehyde dioxime with nitrous acid in a molar ratio of preferably from 1:1 to 1:1.1. Nitrous acid may be conveniently formed in situ by using acidic materials such as acetic acid, sulfuric acid or hydrochloric acid together with a nitrite such as sodium nitrile or potassium nitrite in about stoichiometric amounts. The conversion to the isoxazoline (III) is conveniently carried out at a temperature between 0° C. and 10° C., preferably between 0° C. and 5° C. at atmospheric or elevated pressure and continuously or batchwise in the presence of water as solvent. Usually, the product of the reaction is not isolated and, instead, the aqueous reaction mixture is used as it is as the starting material. Any residues of nitrous acid still present in th mixture are conveniently destroyed by the addition of appropriate amounts of urea.

The isoxazoline (III) used as starting material may for example be prepared as follows: a mixture of malonaldehyde, acid and water is prepared and a nitrite is added thereto portionwise during 10 to 30 minutes at the reaction temperature with thorough mixing. The resulting aqueous reaction mixture is then added portionwise as starting material to the aqueous inorganic base to form the cyanoacetaldehyde.

The starting isoxazoline is split in the presence of alkali or alkaline earth metal oxides or hydroxides, preferably in a molar ratio of from 1 to 3 moles of base per mole of isoxazoline or malonaldehyde dioxime. The following basic compounds are suitable, for example: potassium, strontium and calcium hydroxides, magnesium and calcium oxides and, in particular, sodium hydroxide.

Splitting is generally carried out at a temperature between 0° C. and 40° C. and preferably between 0° C. and 25° C., at atmospheric or elevated pressure and continuously or batchwise. Water is usually employed as solvent and, if desired, organic solvents such as alkanols may also be used, provided they are inert under the conditions of reaction. The reaction thus takes place in a liquid aqueous medium.

Splitting may be carried out as follows: the aqueous mixture obtained from the reaction of malonaldehyde dioxime with nitrous acid is added to the aqueous solution of the alkali metal or alkaline earth metal compound at the desired temperature of reaction. The alkaline reaction mixture is then maintained at the reaction temperature for a further 20 to 60 minutes with efficient stirring, whereupon the dinitrogen oxide formed is separated and the end product, which is stable in alkaline solution and difficult to isolate, is detected by coupling with benzenediazonium chloride and is further processed without isolation.

The cyanoacetaldehyde produced by the process of the invention is a valuable intermediate in the manufacture of dyes and pesticides. Thus for example, by reacting with phenyl hydrazines the corresponding hydrazones may be produced, for example the 4-nitrophenyl hydrazone (see for example Gazz. Chim. Ital., 77, 586 et seq. (1947)). These hydrazones may, like the cyanoacetone hydrazones (see for example Annalen der Chemie, 624, 1 et seq. (1959)), be cyclized to the corresponding 5 - amino pyrazoles substituted in the 1-position. 1-phenyl-5-amino-pyrazoles, for example, are coupling components for dyes (U.K. Pat. No. 837,716).

In the following example the parts are by weight.

EXAMPLE

To 10.2 parts of malonaldehyde dioxime, 40 parts of water and 10 parts of glacial acetic acid there are added portionwise 7 parts of sodium nitrite in 20 parts of water during 15 minutes at a temperature of from 0° to 5° C. with stirring. The nitrite residues are then destroyed by adding 1.5 parts of urea. The cold solution thus obtained is then added portionwise at 10–15° C. with cooling to 24 parts of a 20% w./w. aqueous solution of sodium hydroxide. Dinitrogen oxide is given off. When gas generation has ceased, the solution contains 6 parts of cyanoacetaldehyde (87% of theory). The yield of cyanoacetaldehyde is determined by coupling with benzenediazonium chloride to form the phenylazo cyanoacetaldehyde by the method described in Berichte der Deutschen Chemischen Gesellschaft, 36, 3666 (1903).

The invention is hereby claimed as follows:

1. A liquid phase process for the production of cyanoacetaldehyde which comprises reacting malonaldehyde dioxime with nitrous acid in a molar ratio of about 1:1 to 1:1.1, and splitting the formed isoxazoline reaction product in water at a temperature of from 0° C. to 40° C. in the presence of an inorganic base selected from the class consisting of alkali metal oxides and hydroxides and alkaline earth metal oxides and hydroxides.

2. A process as claimed in claim 1 wherein said splitting is carried out at a temperature of from 0° C. to 25° C.

3. A process as claimed in claim 1 wherein said splitting is carried out at a molar ratio of about 1 to 3 moles of said base per mole of said isoxazoline.

4. A process as claimed in claim 1 wherein said base is sodium hydroxide.

5. A process as claimed in claim 1 wherein the malonaldehyde dioxime and nitrous acid are reacted at a temperature of about 0° C. to 10° C.

6. A process as claimed in claim 5 wherein the isoxazoline initially prepared in water is added as an aqueous mixture portionwise to an aqueous solution of said base.

References Cited
UNITED STATES PATENTS

| 3,517,047 | 6/1970 | Ohno et al. | 260—465.9 |
| 3,647,854 | 3/1972 | Sturm et al. | 260—465.1 |

OTHER REFERENCES

Quilico et al., C.A. 35 (1941), pp. 3637–6 to 3638–2.
Quilico et al., C.A., 41 (1947), pp. 380–g to 382–g.
D'Alcontres, et al., C.A., 46 (1952), p. 495–g–h.

JOSEPH P. BRUST, Primary Examiner

U.S. Cl. X.R.

260—307 H

UNITED STATES PATENT OFFICE
CERTIFICATE OF CORRECTION

Patent No. 3,754,017    Dated August 21, 1973

Inventor(s) Hans Juergen Strum & Herbert Armbrust

It is certified that error appears in the above-identified patent and that said Letters Patent are hereby corrected as shown below:

Column 1, line 29, "hydroxy-lamine" should read -- hydroxylamine --.

Column 1, line 46, "prseence" should read -- presence --.

Column 1, line 66,

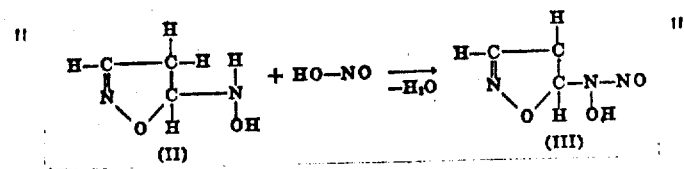

should read

-- 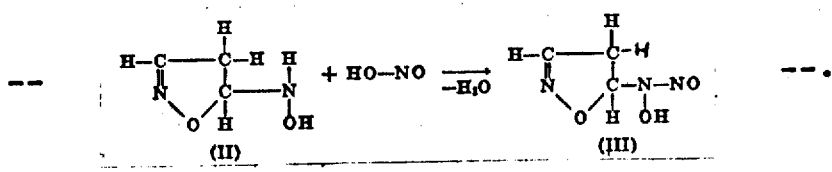 --.

Column 2, line 21, "nitrile" should read -- nitrite --.

Column 2, line 30, "th" should read -- the --.

Signed and sealed this 17th day of September 1974.

(SEAL)
Attest:

McCOY M. GIBSON JR.
Atesting Officer

C. MARSHALL DANN
Commissioner of Patents